(12) United States Patent
Kacines

(10) Patent No.: US 10,477,776 B1
(45) Date of Patent: Nov. 19, 2019

(54) SPRING-LOADED WREATH HANGER

(71) Applicant: Jeffery J. Kacines, Allen, TX (US)

(72) Inventor: Jeffery J. Kacines, Allen, TX (US)

( * ) Notice: Subject to any disclaimer, the term of this patent is extended or adjusted under 35 U.S.C. 154(b) by 0 days.

(21) Appl. No.: 16/032,233

(22) Filed: Jul. 11, 2018

(51) Int. Cl.
*F16M 13/02* (2006.01)
*A01G 5/04* (2006.01)

(52) U.S. Cl.
CPC ............ *A01G 5/04* (2013.01); *F16M 13/022* (2013.01)

(58) Field of Classification Search
USPC ................................. 248/27.8, 304
See application file for complete search history.

(56) References Cited

U.S. PATENT DOCUMENTS

| | | | | |
|---|---|---|---|---|
| 5,553,823 A * | 9/1996 | Protz, Jr. | ................... | A01G 5/04 248/215 |
| 6,302,365 B1 * | 10/2001 | Catanzarite | ........ | A47G 25/0614 248/215 |
| 6,311,851 B1 * | 11/2001 | Knudsen, Sr. | ........... | A01G 5/04 211/13.1 |
| 6,575,416 B1 * | 6/2003 | Avinger | ............. | A47G 25/0614 248/215 |
| 7,740,222 B2 * | 6/2010 | Wang | ................... | A47G 1/1653 248/215 |
| 7,887,017 B2 * | 2/2011 | Moran | ...................... | B44C 5/00 248/215 |
| 8,777,023 B2 * | 7/2014 | Hendricks | ................ | A01G 5/04 160/349.2 |
| 2002/0104937 A1 * | 8/2002 | Avinger | ................... | A01G 5/04 248/215 |
| 2004/0173550 A1 * | 9/2004 | Adams | ............... | A47G 25/0614 211/118 |
| 2009/0189037 A1 * | 7/2009 | Shortell | ................... | A01G 5/04 248/220.1 |
| 2012/0043444 A1 * | 2/2012 | Kingery | ................... | A01G 5/04 248/295.11 |

* cited by examiner

*Primary Examiner* — Monica E Millner
(74) *Attorney, Agent, or Firm* — Roger N. Chauza, PC

(57) ABSTRACT

An over-the-door hanger for clamping to a top of a door. Opposing wings are spring biased to a base plate. The base plate is located adjacent the outside surface of the door, and includes a hook hanging downwardly from the base plate. The wings span the top edge of the door and have downturned ends. During installation, the downturned ends of each wing are moved against the spring tension so as to be lowered over the top edge of the door in an orientation where the base plate is located on the outside of the door and the downturned ends are located on the inside of the door. The hanger is thus clamped to the top of the door under the spring tension.

18 Claims, 12 Drawing Sheets

SPRING-LOADED WREATH HANGER

TECHNICAL FIELD OF THE INVENTION

The present invention relates in general to hangers and clamps, and more particularly to spring-loaded hangers and clamps.

BACKGROUND OF THE INVENTION

During various seasons it is customary to hang ornamental items from a door. For example, during the Christmas season, wreaths, candy canes, snowmen and other Christmas characters are hung from the front door to celebrate the holiday season. During the autumn season, various decorative items are hung from the front door to celebrate the Thanksgiving and Halloween holidays. The Fourth of July holiday is also celebrated by hanging decorative items from a person's front door.

The simplest technique to hang decorative items from a front door is to either hammer a nail into the door, or drive a screw into the frontal surface of the door. This is effective as the hanger remains stationary, but the nail or screw is unsightly when not used, and if removed, there is an unsightly hole in the frontal surface of the door.

Another commonly employed technique is to purchase a hanger that hangs over the top of the door, and down the frontal surface. This type of hanger is constructed with a hook to hang a decorative item therefrom. Such type of hanger is disclosed in U.S. Design Pat. D353,992; D494,844 and D746,127. The over-the-door hangers can also be made adjustable, as disclosed in U.S. Pat. Nos. 5,553,823; 6,575,416 and 6,857,608. These door hangers have the advantage that they can be removed from the door and there are no unsightly holes in the door.

The conventional over-the-door hanger suffers from the disadvantage that it can slide along the top edge of the door. The movement of the door hanger can be occasioned when the door is opened or closed, when brushing against the ornament hanging from the door hanger, or by the wind which can apply a sideways force to the decorative ornament, and thus to the hanger. The inadvertent movement of the hanger allows the decorative ornament to move from its centered position on the door.

Many door hangers have a channel-shaped member that fits over the top edge of the door and includes a strap and hook arrangement that hangs down on the frontal side of the door to hang ornaments therefrom. The difficulty with this type of over-the-door hanger is that a single channel member does not fit doors of different thicknesses. Hangers of this type must be manufactured with different channel-shaped members so that doors of different thicknesses can be accommodated.

Door hangers can be fabricated so that with a kit of different parts, the hanger can accommodate doors of different thicknesses, different materials e.g., wood, metal, fiberglass, etc., and different sizes. The parts can be chosen from the kit and fastened together with screws, nails, pliers, screw drivers, etc., so that the user can make the hanger fit the particular door. This, of course, requires some skill and the availability of tools and the time to assemble the door hanger.

From the foregoing, it can be seen that there is a need for a door hanger that can be easily installed on a door, or removed therefrom, but yet is firmly anchored to the door without using nails, screws or tools. Another need exists for an over-the-door hanger that has spring-loaded members that clamp to the top of the door, thereby firmly anchoring the hanger to the door. Yet a further need exists for an over-the-door hanger that clamps to doors of varying thicknesses without the need for any tools to adjust the hanger.

SUMMARY OF THE INVENTION

In accordance with the principles and concepts of the invention, disclosed is an over-the-door hanger that is spring loaded and clamps onto doors of varying thicknesses. The spring-loaded members can be separated by the user, installed over the door, and then released without using any tools or hardware. The door hanger can be easily removed by reversing the steps.

A feature of the door hanger of the invention is that it employs a upright leg with a hook for suspending ornaments or items therefrom. The top of the upright leg is connected to a base plate which engages with the front surface of the door. A pair of spring-loaded wings are attached to the base plate and, when the wings are rotated against the spring bias and engaged over the top of the door and released, the hanger firmly clamps the door between the wings and the base plate.

According to another feature of the invention, the upright leg is constructed so as to be adjustable. By manually adjusting the effective length of the upright leg, the hook at the bottom thereof can be adjusted so that the ornament hung therefrom is oriented vertically at a location satisfactory to the user.

According to a further feature of the invention, the door apparatus can be clamped to bifold doors to cause them to move to open or closed positions, depending on the direction of the spring bias of the wings.

In accordance with an embodiment of the invention, disclosed is an over-the-door apparatus attachable to a door structure. The door apparatus includes a base plate having at least one tubular receptacle, and the base plate is engageable with an outside surface of the door structure. At least one elongate wing has a pivot post attached to an inner end of the wing, where the pivot post of the wing is inserted into the tubular receptacle. The wing has a downturned end located at an outer end of the wing. The downturned end engages an inside surface of the door structure. A spring member biases the elongate wing so that the pivot post of the elongate wing pivots in the tubular receptacle of the base plate, whereby the downturned end of the elongate wing is biased against the inside surface of the door structure.

According to another embodiment of the invention, disclosed is an over-the-door apparatus which includes a base plate engageable with an outer surface of a door structure. The apparatus also includes an upright leg member depending from the base plate, where a bottom end of the upright leg member has a hook for hanging an item therefrom. A first wing has a first end and a second end. The first end of the first wing is pivotal about a vertical axis to the base plate, and a first downturned arm is attached to the second end of the first wing. A second wing has a first end and a second end. The first end of the second wing is pivotal about a vertical axis to the base plate, and a second downturned arm is attached to the second end of the second wing. At least one spring member is provided for pivoting the first wing and the second wing in opposite directions.

According to yet another embodiment of the invention, disclosed is a method of constructing an over-the-door apparatus. The method includes fabricating a base plate adapted for placement adjacent an outside surface of a door structure. A first wing and a second wing are fabricated with respective outer ends that are downturned. The downturned ends are adapted for engaging an inner surface of the door structure. The inner end of the first wing is mounted to the base plate so that the outer downturned end of the first wing is spring biased to the base plate. An inner end of the second wing is mounted to the base plate so that the outer downturned end of the second wing is spring biased to the base plate. A hook depends downwardly from the base plate to hang an item therefrom.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
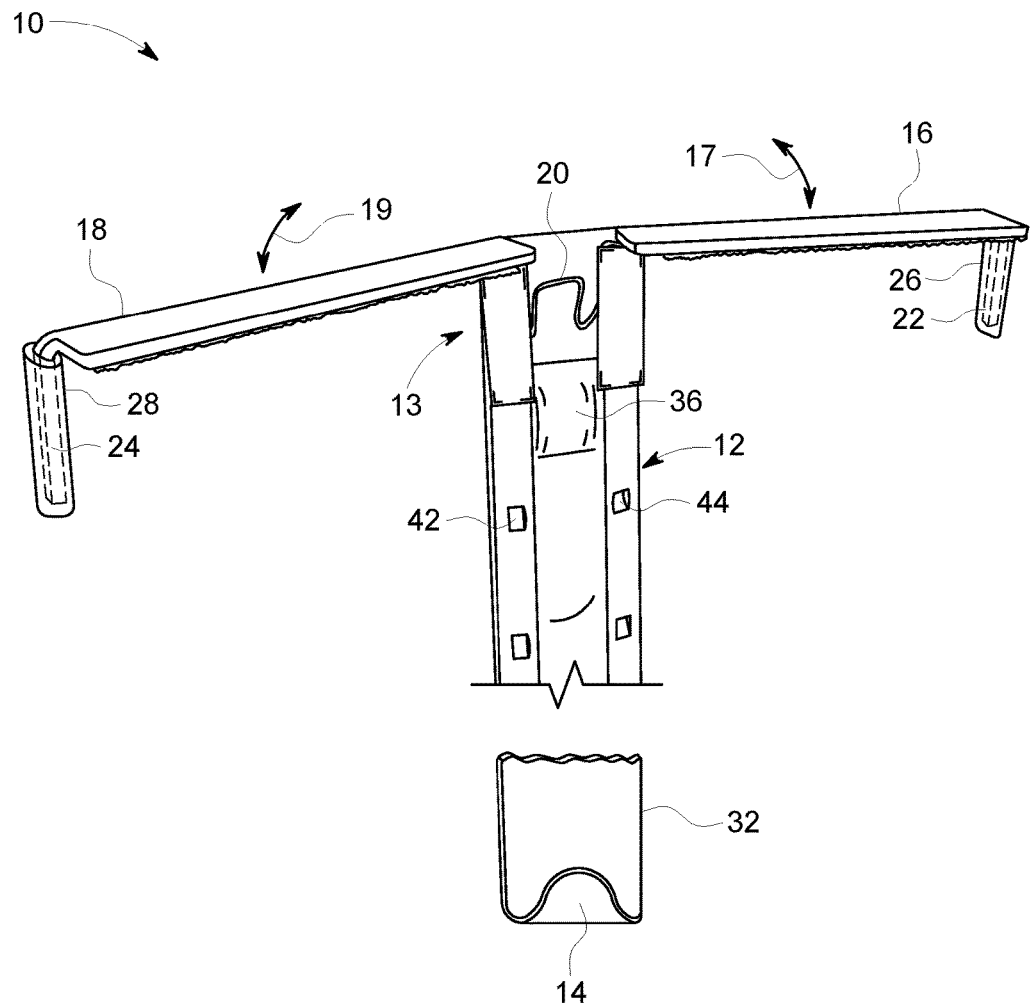
FIG. 1 is an isometric frontal view of the spring-loaded door hanger constructed according to one embodiment of the invention.
Figure 2:
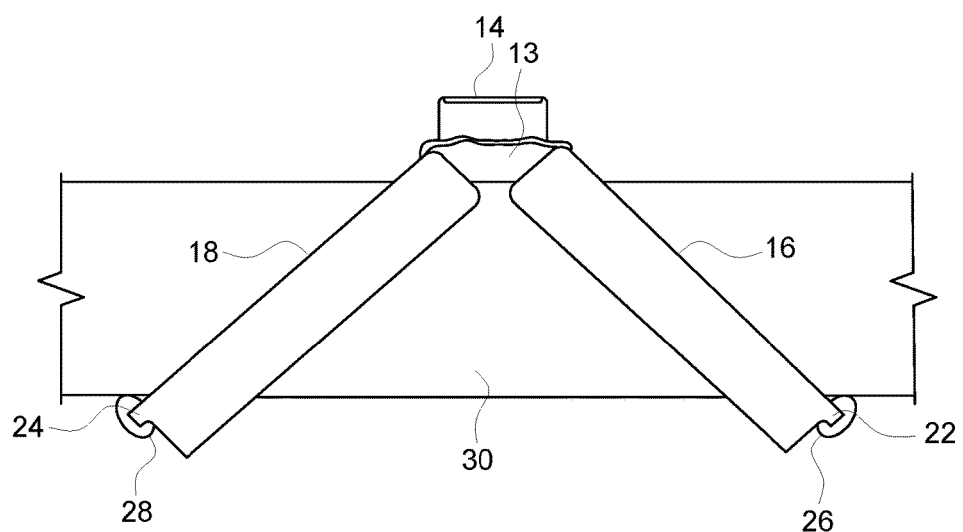
FIG. 2 is a top view of the spring-loaded door hanger of FIG. 1, as installed on the top edge of a door.

FIGS. 1 and 2 illustrate a spring-loaded door hanger 10 constructed according to one embodiment of the invention. As will be described in detail below, the door hanger 10 is constructed with an upright leg 12 having an adjustable hook 14 attached to the bottom end thereof. Fabricated at the top of the upright leg 12 is a base plate 13. A first wing 16 is mounted to the top of the base plate 13 in a pivotal manner, and is spring loaded with a spring, a visible portion of which is shown as numeral 20. Similarly, a second wing 18 is mounted to the top of the base plate 13 in a pivotal manner, and is also spring loaded with the spring 20. The first wing 16 and the second wing 18 are opposed so that they can extend in essentially opposite directions when the spring tension is released. As will be described below, the spring 20 biases the first and second wings 16 and 18 so that they pivot in opposite directions as illustrated by respective arrows 17 and 19. When the door hanger 10 is installed over the top edge of a door 30, the wings 16 and 18 are manually moved in the directions opposite the arrows 17 and 19 to increase the tension on the spring 20.

At the terminal end of the first wing 16 is a down-turned arm 22 covered with a plastic sleeve 26. Similarly, fabricated at the terminal end of the second wing 18 is a down-turned arm 24, also covered with a plastic sleeve 28. The plastic sleeves 26 and 28 prevent the down-turned arms 22 and 24 from marring the inside surface of a door structure, including a conventional entrance door 30 of a residence or business. In addition, the plastic sleeves 26 and 28 are constructed of a soft plastic which also provides a friction engagement with the surface of the door 30 and prevent moving or displacement of the hanger 10 during use. The inside surface (not shown) of the base plate 13 and the upright leg 12 can also be covered with a cushion material to prevent the outer surface of the door 30 from being marred. If used, the cushion bonded to the base plate 13 would be considered a part of the base plate 13. The upright leg 12 can be constructed with an adjustable hook 14, as described below, or as a simple metal piece with a hook 14 at the bottom end thereof.

FIG. 2 is a top view of the spring-loaded door hanger 10 as installed over the top edge of the door 30. The installation of the spring-loaded door hanger 10 to the door 30 is quick and easy. First, the door 30 is opened so that the top thereof is exposed and available. Next, the door hanger 10 is suspended over the top edge of the door 30, with the opposed wings 16 and 18 manually rotated about their pivot points on the upright leg 12, against the tension of the spring 20 (opposite the arrows 17 and 19). Then the spring-loaded door hanger 10 is lowered onto the top edge of the door 30 so that the upright leg 12 is on the outside of the door 30, and the two down-turned arms 22 and 24 are on the inside of the top of the door 30. The opposed wings 16 and 18 are then released so that the tension of the spring 20 clamps the door hanger 10 to the top edge of the door 30. It should be realized that the two opposed wings 16 and 18 are flat planar members that lie on the top edge of the door 30 and do not interfere with the opening or closing of the door 30 within the overlying top portion of the door frame (not shown). To be described in detail below, the hook 14 is adjustable, so that the user can adjust the effective length of the upright leg 12 to accommodate the size and placement of the seasonal ornament with respect to the height of the door 30. A seasonal item can be hung from the hook 14 for display to persons passing by the house, business or the like. Once the season has passed, the ornament can be removed from the hook 14, the door 30 can be opened and the door hanger 10 lifted upwardly and removed from the door 30, and stored away until the next season arrives.

With regard to the details of the spring-loaded door hanger 10, the various components are constructed with sheet steel that is coated or otherwise processed to provide a weather resistant item. The first wing 16 is constructed of sheet metal so that it is generally flat and planar. The first wing 16 is stamped or otherwise cut so that there is a narrow portion which, when downturned, forms the downturned arm 22. The inner or pivotal end of the first wing 16 is formed with a portion that is formed into a rounded rod-shaped member (shown in FIG. 3) which, when bent downwardly, forms a pivotal post 25. The second wing 18 is similarly fabricated. A short section of a soft plastic sleeve 26 and 28 is then forced over both of the downturned arms 22 and 24. The sleeves 26 and 28 can also be of the heat shrinkable material. If employed, the sleeves 26 and 28 are considered a part of the downturned arms 22 and 24.

Figure 3:
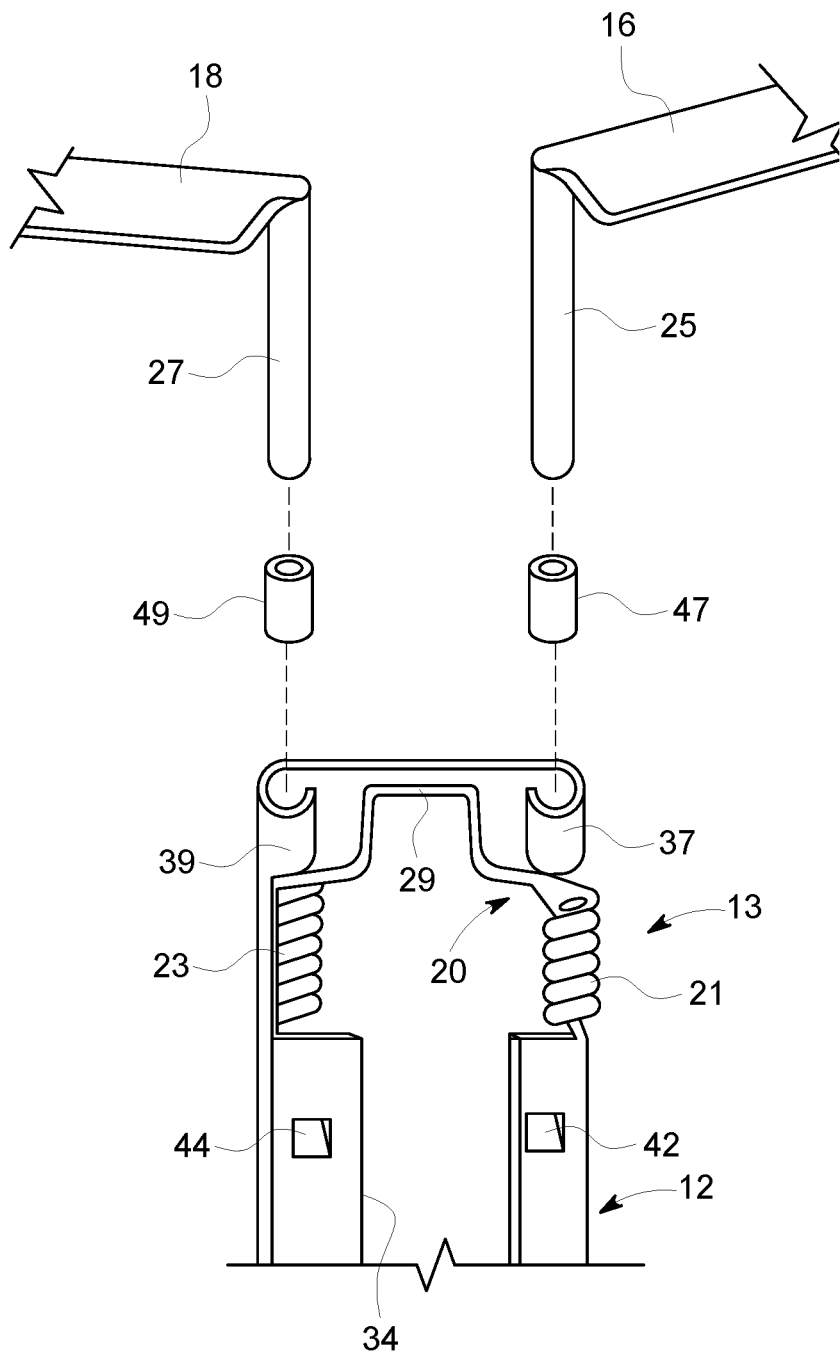
FIG. 3 is an enlarged view of the double spring and its engagement with the two wings.

FIG. 3 is an enlarged and exploded view of the dual spring member 20 and the respective pivot posts 25 and 27 of the wings 16 and 18. The top end of the upright leg 12 can be considered a base plate 13 to which the spring member 20 is attached. The spring member 20 is constructed of a single piece of wire spring formed in the shape illustrated, with a torsion spring 21 and 23 formed at each end of the spring wire. The two torsion springs 21 and 23 are connected by an arch-shaped section 29. Each torsion spring 21 and 23 is formed with a hollow center so as to receive therein a respective pivot post 25 and 27 of the wings 16 and 18. The bottom end of the torsion spring 21 terminates in a conical shape that ends with a diameter somewhat smaller than the diameter of the pivot post 25. When the spring 21 is pressed onto the end of the pivot post 25, the bottom of the spring 21 becomes press fit and thus attached to the pivot post 25. With this construction, the bottom end of the torsion spring 21 rotates with the pivot post 25 and creates a torsional force when the wing 16 is rotated clockwise in FIG. 3. The other torsion spring 23 is similarly press fit onto the bottom of the pivot post 27 of wing 18. The arch section 29 of the spring 20 engages flat against the base plate 13, as illustrated in FIG. 1. The other torsion spring 23 engages with the other pivot post 27 so as to create a torsional force when the wing 18 is rotated in a counterclockwise direction in FIG. 3. It can be appreciated that rather than utilizing a dual spring member 20 as illustrated, a separate torsion spring could be used with each pivot post 25 and 27.

Figure 5:
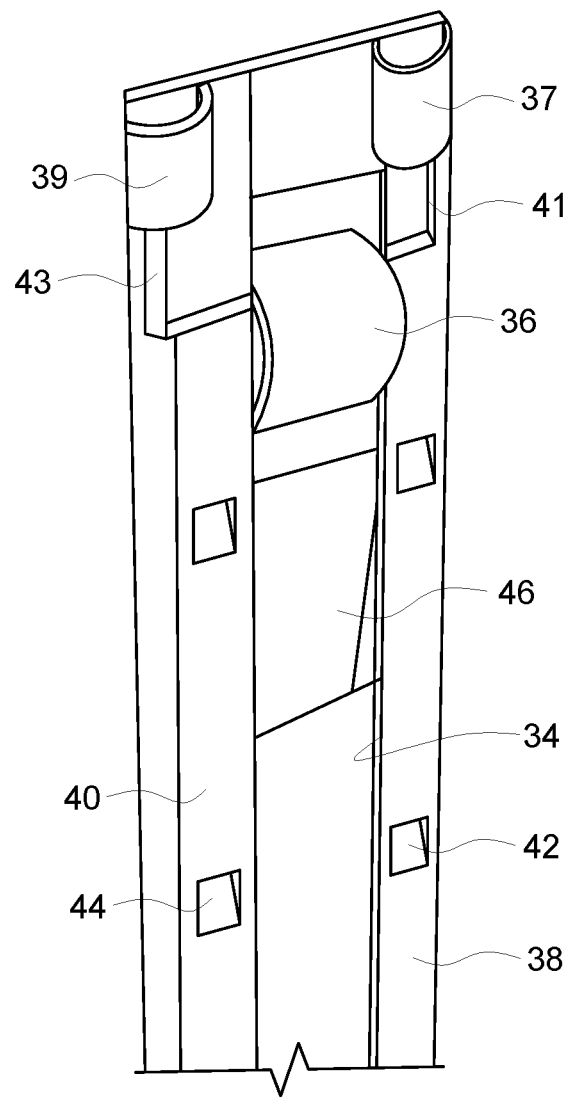
FIG. 5 is an isometric back view of a top portion of the upright leg showing the slot in which the finger tab slides to adjust the vertical position of the hook.

With reference to FIGS. 3 and 5, there is illustrated the manner in which the pivot posts 25 and 27 are rotationally mounted to the base plate 13. The top of the base plate 13 is formed with two open tubular receptacles 37 and 39. By "open" it is meant that the sidewall of the tubular receptacles 37 and 39 have a vertical slit or opening therein so that the effective diameter of the receptacles 37 and 39 can be made smaller by crimping or the like. Bushings 47 and 49 are then inserted over the respective pivot posts 25 and 27. The receptacles 37 and 39 are cylindrical with vertical slits therein so that the bushings 47 and 49 can be inserted therein and crimped. The bushings 47 and 49 are thus constrained from rotation, but the pivot posts 25 and 27 can rotate within the respective bushings 47 and 49.

During installation of the wing 16 to the base plate 13, the bushing 47 is inserted over the pivot post 25 of wing 16. The spring 21 is partially inserted onto the bottom end of the pivot post 25 until the smaller bottom end of the spring 21 fits tightly onto the pivot post 25. The wings 16 and 18 are then oriented in an angular position where it is desired that there be no spring torsion exerted thereon. In practice, the wings 16 and 18 are placed about 180 degrees apart when the torsion force of the springs 21 and 23 are relaxed. Then, the spring 21 is either pressed or hammered further onto the bottom of the pivot post 25 until the bottom part of the spring 21 is tightly fastened to the pivot post 25. The other wing 18 is similarly assembled with the bushing 49 and the other spring 23. The wings 16 and 18 are then placed into the base plate 13 so that the bushings 47 and 49 are inserted within the opened receptacles 37 and 39, and the springs 21 and 23 are placed within the respective notches 41 and 43 (FIG. 5). The receptacles 37 and 39 are then crimped around the respective bushings 47 and 49. Thereafter, when the wing 16 is rotated clockwise and the wing 18 is rotated counterclockwise as illustrated in FIG. 3, the springs 21 and 23 will provide respective counterforces.

Figure 4:
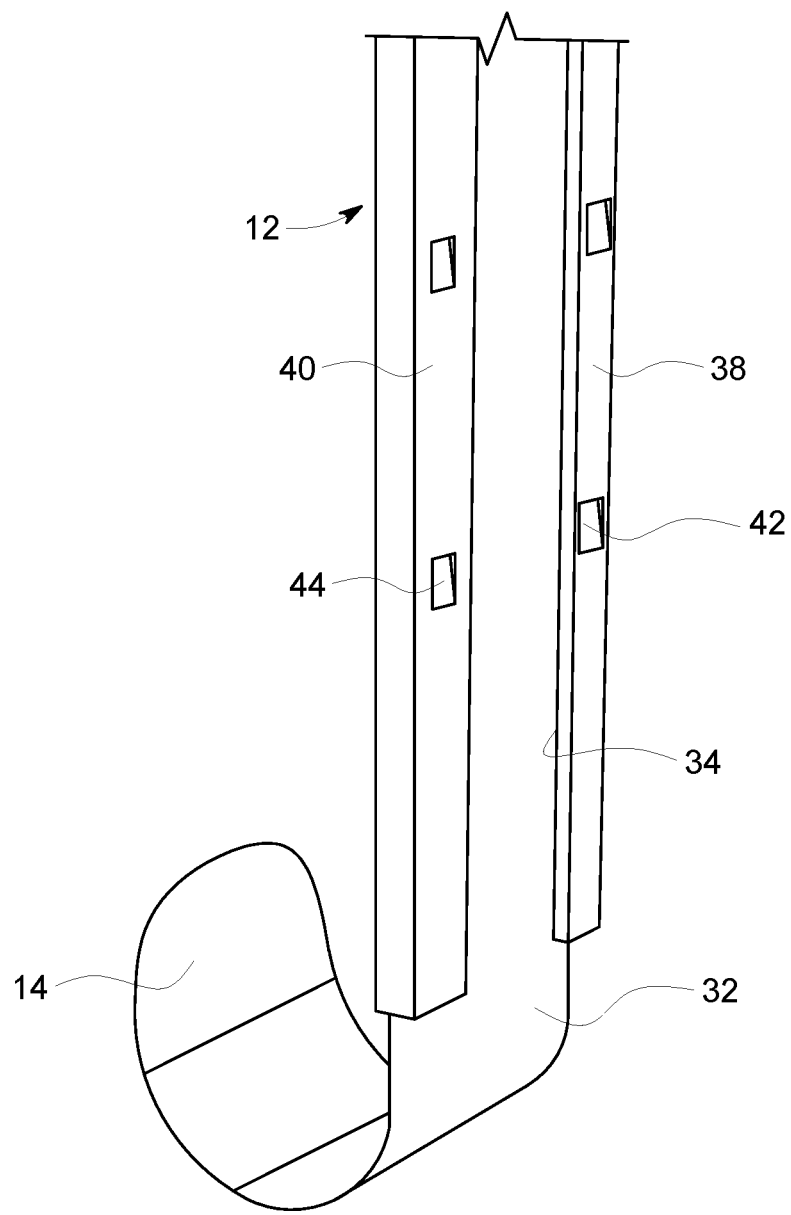
FIG. 4 is an isometric back view of a bottom portion of the upright leg in which the hook is made adjustable.

FIGS. 4-7 illustrate the details of the mechanism for making the bottom hook 14 adjustable. The adjustable mechanism is of the type familiar in the prior art. FIG. 4 illustrates a bottom portion of the upright leg 12 in which the hook 14 is adjustable. The upright leg 12 is channel-shaped for sliding therein an elongate blade 32 to which the hook 14 is attached at the bottom end thereof. The upright leg 12 is not formed as a closed channel, but rather has an elongate vertical opening or slot 34 in which a leaf spring finger-operated tab 36 (FIG. 5) is slideable up and down. The finger-operated tab 36 is located on the top portion of the slideable blade 32 and can be slid up or down to adjust the vertical position of the hook 14 with respect to the door 30.

The channel-shaped upright leg 12 is constructed with two coplanar sides 38 and 40 in which barbs 42 and 44 are formed. Each side 38 and 40 is constructed by stamping and forming so that a plurality of vertically spaced-apart barbs 42 and 44 are formed. The barbs 42 and 44 are bent inwardly toward the internal space of the channel-shaped upright leg 12.

Figure 6:
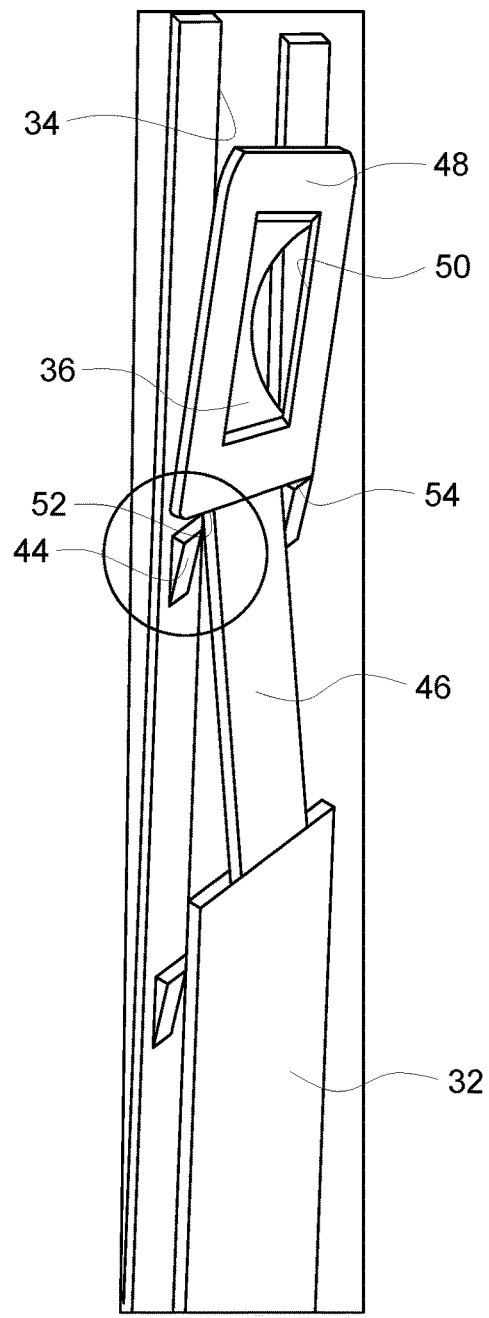
FIG. 6 is an isometric view of the upper portion of the blade and the finger-operated tab, as engaged with the opposing barbs.
Figure 7:
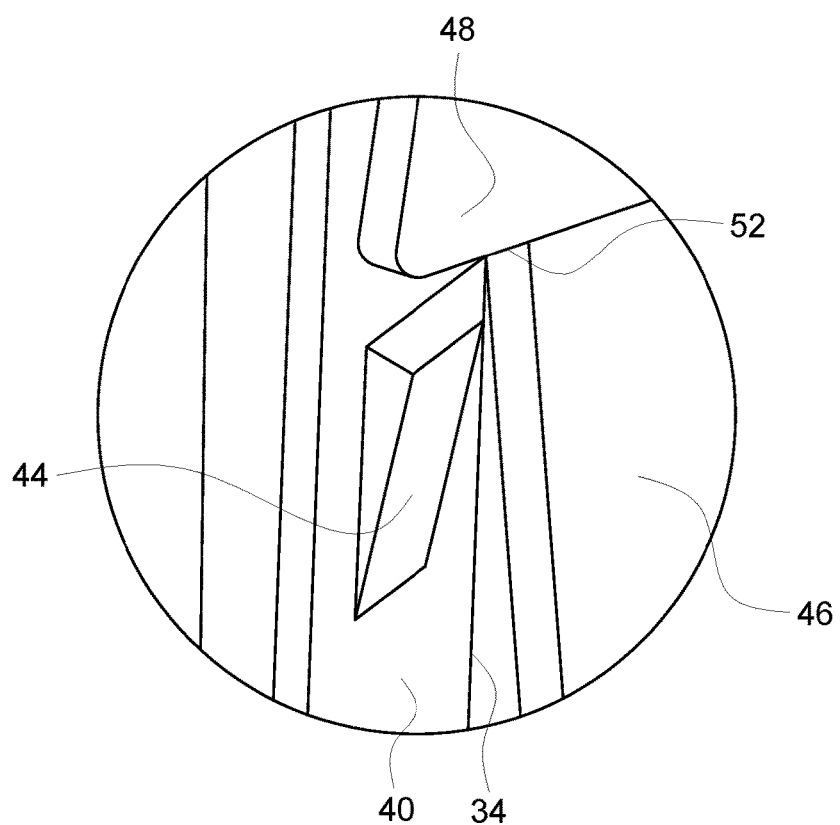
FIG. 7 is an enlarged view of the top portion of the blade engaged with a barb.

The top portion of the blade 32 is illustrated in FIG. 5, and the engagement thereof with one of the barbs 44 is illustrated in FIGS. 6 and 7. The blade 32 is constrained within the channel-shaped upright leg 12, but can slide up and down to effective shorten or lengthen the length of the upright leg 12. This effectively relocates the hook 14 up and down with respect to the channel-shaped upright leg 12. Near the top, the blade 32 includes a narrowed part 46 that is bent somewhat with respect to the bottom part. FIG. 6 illustrates this construction. Attached to the top end of the narrowed part 46 is a widened part 48 that is again bent somewhat. Formed within the widened part 48 is the outwardly curved finger tab 36. The curved finger tab 36 protrudes through the slot 34 formed in the channel-shaped upright leg 12. Importantly, the widened part 48 includes two bottom corners 52 and 54, each of which can engage with a respective barb 42 and 44. The engagement of the corner 52 is shown abutted against the barb 44 in FIG. 7. When the corners 52 and 54 are engaged with respective barbs 42 and 44, the blade 32 is prevented from downward movement within the channel-shaped upright leg 32. Accordingly, when an ornamental item is suspended from the hook 14, the blade 32 will support the load on the barbs 42 and 44 and will not slide downwardly. In other words, the engagement of the corners 52 and 54 with the respective barbs 42 and 44 lock the blade 32 against downward movement.

When it is desired to readjust the blade 32 downwardly within the channel-shaped upright leg 12, the finger tab 36 can be depressed so that the corners 52 and 54 are disengaged from the respective barbs 42 and 44. The blade 32 can then be moved down to a different position where the corners 52 and 54 are again engaged with a different set of barbs. If it is desired to move the hook 14 upwardly, then the user simply pushes the hook 14 upwardly without having to depress the finger tab 36. To adjust the position of the hook 14, and when the door hanger 10 has been installed on the top edge of the door 30, the bottom of the upright leg 12 can be moved away from the frontal surface of the door to gain access to the finger tab 36. Alternatively, the door hanger 10 can be removed from the door 30 to gain access to the finger tab 36. The accessibility of the finger tab 36 is limited so that it cannot be inadvertently pushed to allow undesired movement of the blade 32.

Figure 8:
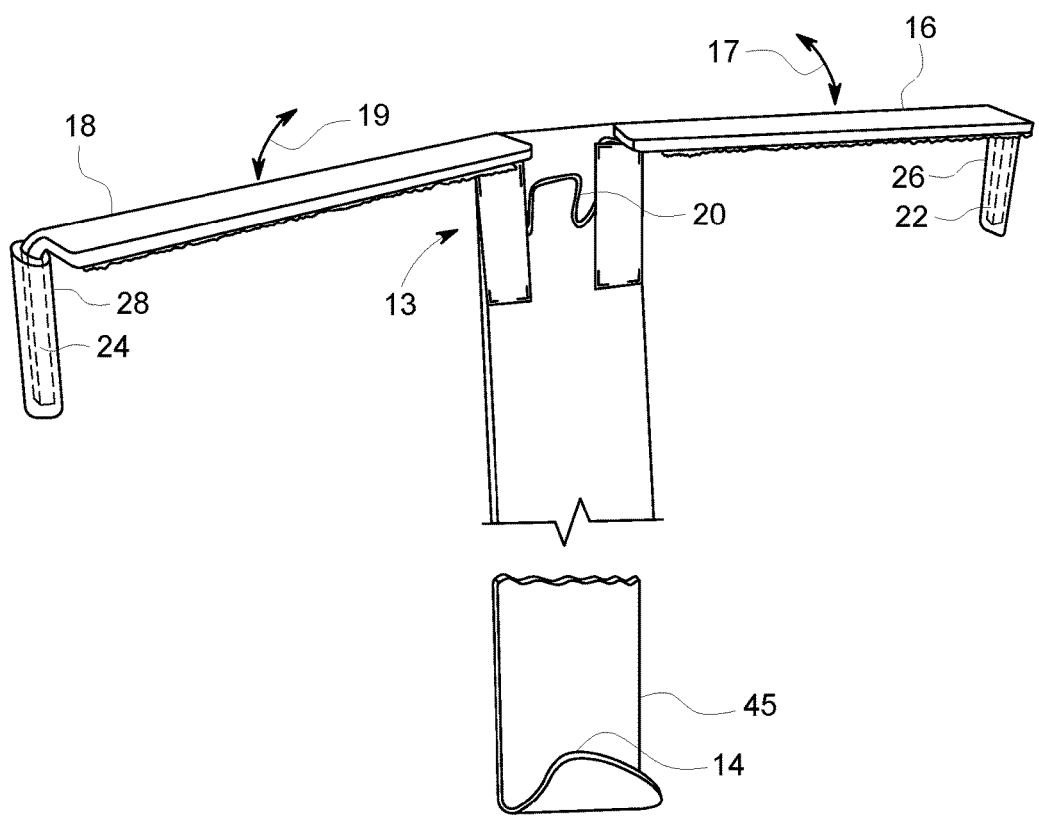
FIG. 8 is an isometric frontal view of an over-the-top door hanger constructed according to another embodiment of the invention.

While the adjustability of the hook 14 provides an advantage, this feature is not necessary to the utility of the over-the-top door hanger 10. Rather, the door hanger 10 can be constructed more efficiently and more cost effective by simply forming the upright leg as a planar strip of metal having the bottom end turned outwardly and upwardly into a hook. This is illustrated in FIG. 8. The base plate 13 of the upright leg 45 is constructed in a manner similar to that shown in FIG. 3 so that the pivot posts 25 and 27 can be rotationally mounted therein. The spring 20 serves the same function as that described above. However, the middle and bottom portions of the upright leg 45 is are not channel-shaped, but are simply a planar strip of metal of suitable length with the hook 14 formed at the bottom end thereof. This simplifies the manufacture and provides a more cost effective over-the-door hanger.

Figure 9:
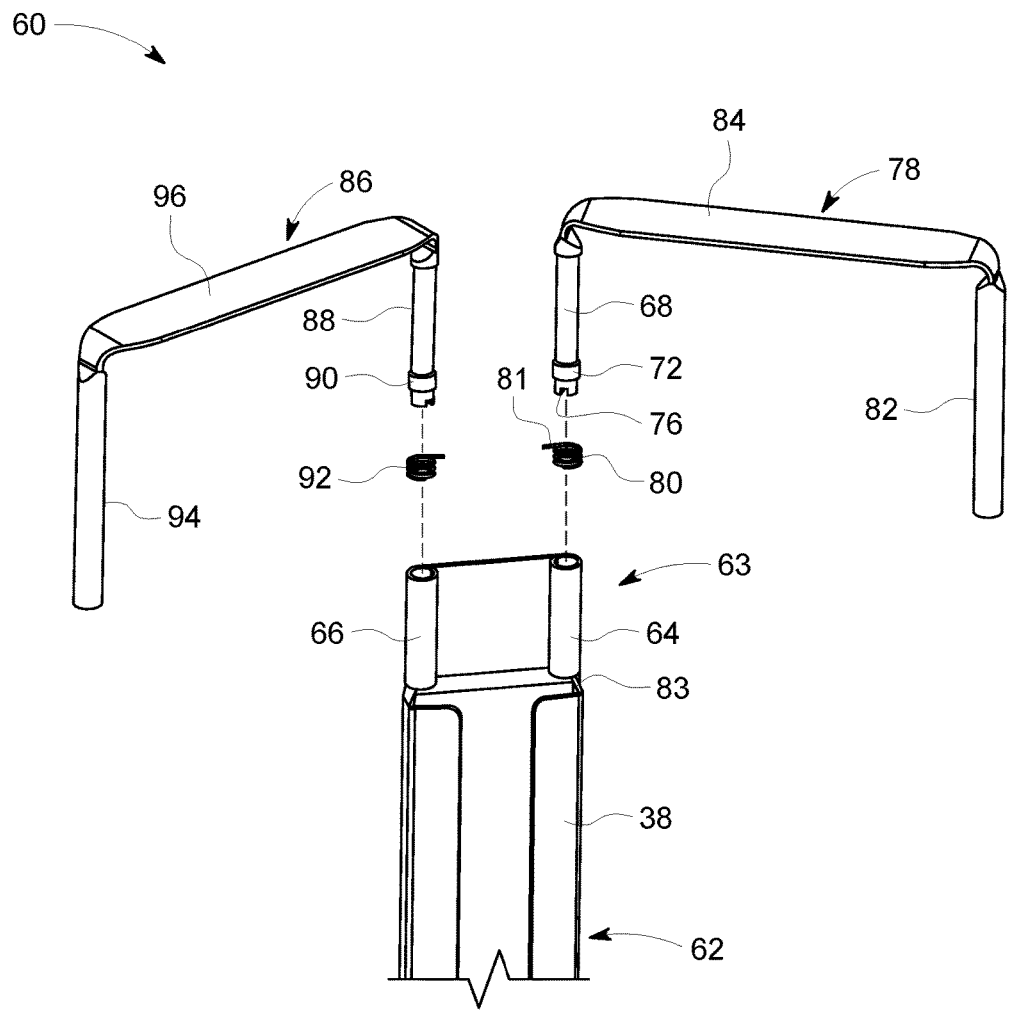
FIG. 9 is an isometric view of yet another embodiment of an over-the-top door hanger.

FIG. 9 illustrates another embodiment of the spring-loaded and over-the-door hanger 60. Here, the middle and bottom portion of the upright leg 62 are constructed the same as that shown in FIGS. 1-6 to provide adjustability to the bottom hook 14 (not shown). The top portion of the upright leg 62 comprises a base plate 63 and is constructed with a pair of tubular members, shown as numerals 64 and 66. The tubular members 64 and 66 are formed by bending the sheet steel of the upright leg 62 to form tubular receptacles. The top end of the upright leg 62 is a base plate to which the spring member 20, comprising individual torsion springs 80 and 92, is attached, as well as the pivot posts 68 and 88 of the respective wings 78 and 86.

The door hanger 60 includes a first wing 78. The first wing 78 is fabricated with a vertical pivot post 68 that fits within the receptacle 64 until the top edge of the receptacle abuts against a shoulder on the pivot post 68. A cap 72 is bonded or otherwise fastened to the bottom end of the pivot post 68. The cap 72 is constructed with a bottom notch 76. In this embodiment, the spring member includes a pair of individual torsion springs 80 and 92. The torsion springs 80 and 92 are inserted over the thinner body part of the respective caps 72 and 90. Each torsion spring 80 and 92 is formed with a top tangential spring end 81 that engages with flat surface of the base plate 63 and prevents the top end of spring 80 from turning when the wing 78 is rotated. The bottom end of the spring 80 is bent inwardly and engages within the slot 76 of the cap 72 when the spring 80 is inserted over the body of the cap 72. Accordingly, when the wing 78, for example, is rotated clockwise, the top of the torsion spring 80 does not rotate as it is lodged against the flat back of the base plate 63, but the bottom end of the spring 80 does rotate as it is locked within the slot 76 of the cap 72. The spring 80 thus exerts a counterforce against the clockwise rotation of the wing 78. The other torsion spring 92 engages with the other cap 90 in a similar manner.

During assembly of the wing 78 and associated components, the cap 72 with the spring 80 inserted thereon is placed in gap 83 at the bottom of the base plate 63. The combined cap 72 and spring 80 rest on the top edge of the channel 38, which captures the bottom end of the spring 80 onto the cap 72. The cap 72 is rotated so that the tangential end 81 of the spring 80 engages the flat back of the base plate 63. A bonding agent is then placed on the bottom end of the pivot post 68 and it is inserted through the tubular member 64 and into the cap 72—while the cap 72 and spring 80 are held within the gap 83, and with the wing 78 positioned about 180 degrees outwardly in alignment with the back of the base plate 63. The bonding agent is then allowed to set. The terminal end of the first wing 78 is formed with a downturned rod-shaped member 82 that engages against the inside surface of the door 30. The pivot post 68 and the downturned member 82 are spaced apart and connected by a flat and planar sheet metal connecting part 84. Like the other embodiments described herein, the flat connecting part 84 engages the top edge of the door 30 in a manner that allows the door 30 to be opened and closed without interference.

The second wing 86 and the corresponding spring assembly are constructed and assembled in the same manner as the first wing 78. A cap 90 with the spring 92 is placed in the gap. The pivot post 88 of wing 86 is inserted through the receptacle 66 of the base plate 63, and bonded to the cap 90. When the wing 86 is manually rotated in the counterclockwise, the spring provides a counterforce. The spring-loaded door hanger 60 functions in a manner similar to that described above in the other embodiments. Also, the spring-loaded door hanger 60 is installed on the top of the door 30 in the same manner described above.

Figure 10:
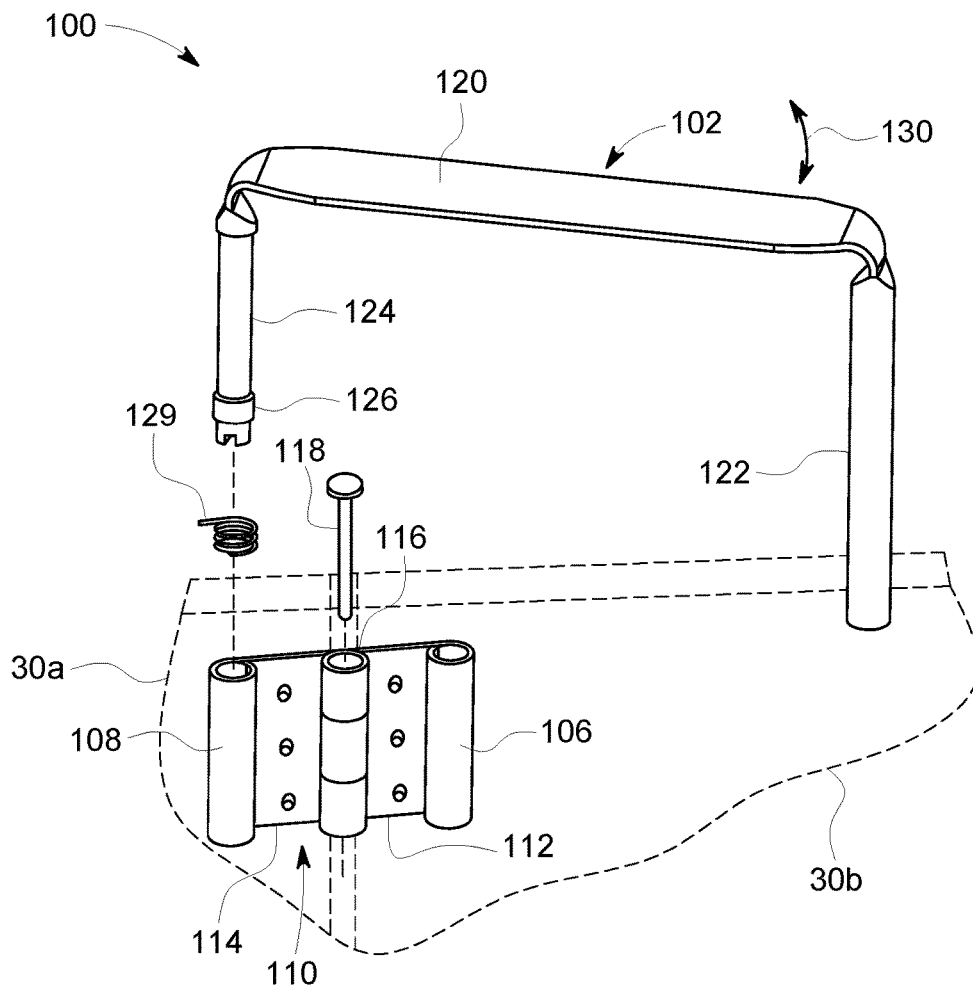
FIG. 10 illustrates the spring-loaded door apparatus adapted for use in maintaining bifold doors open or closed.

FIG. 10 illustrates spring-loaded door apparatus 100 adapted for either closing or opening bifold and other types of door structures. Bifold doors are well known for use as interior doors to provide a closure to small rooms, such as closets, pantries, etc. The spring-loaded door apparatus 100 includes many of the same features as the over-the-top door hangers described above. The spring-loaded door apparatus 100 is fabricated with a single spring-loaded wing 102, although a pair of wings could be utilized. The wing 102 is constructed in a manner similar to the embodiment illustrated in FIG. 9, and inserted into the tubular receptacle 108 of a hinged base plate 110. The hinged base plate 110 also includes a second tubular receptacle 106 for insertion of a second wing (not shown) if a dual wing door apparatus is desired. As can be seen in FIG. 10, the wing 102 is pivotally attached at one end thereof to one door panel 30a via the base plate 110, and crosses over to the other door panel 30b which is engaged by the terminal downturned end 122. Depending on which way the torsion spring 129 exerts a force on the wing 102, the tendency of the door apparatus 100 is to either open or close the door panels 30a and 30b. In other words, if the spring 129 exerts a clockwise torsional force on the wing 102, the bifold door panels 30a and 30b will move together so as to open. Conversely, if the torsion spring 129 exerts a counterclockwise torsional force on the wing 102, the bifold door panels 30a and 30b will move apart so as to close. The spring 128 is considered as a spring member. It should be appreciated that the terminal downturned end 122 of the wing 102 would be placed on the side of the door panel 30b as shown when it is desired to close the bifold doors 30a and 30b, and would be placed on the opposite side of the door panel 30b during installation if it is desired to open the door panels 30a and 30b. The hinged base plate 110 is constructed as a hinge with a first leaf 112 hinged to a second leaf 114 by a conventional knuckle 116 and pin 118. The leaf 112 and the leaf 114 have holes therein for screwing to two adjacent panels 30a and 30b of a bifold door.

In more detail, the planar interconnecting part 120 of wing 102 has an outer downturned rod 122, a pivot post 124 that is inserted into the receptacle 108 of hinge leaf 114, the notched cap 126 and the spring 129, all similar to that described above in connection with the embodiment of FIG. 9. The wing 102 is spring biased to move in the direction of arrow 130 so that the door panels 30a and 30b tend to close, i.e., to move apart. It can be appreciated that if two wings and two springs are employed, and when spring biased to close the bifold doors, the wings will overlap, since they are criss-crossed with respect to the hinged base plate 110. As such, one pivot post should be shorter than the other pivot post so that one wing underlies the other wing. Further, when using two wings, one or both wings could be fabricated with dog-leg shapes so as to reduce or eliminate any interference of movement of one wing with respect to the other wing.

Figure 11:
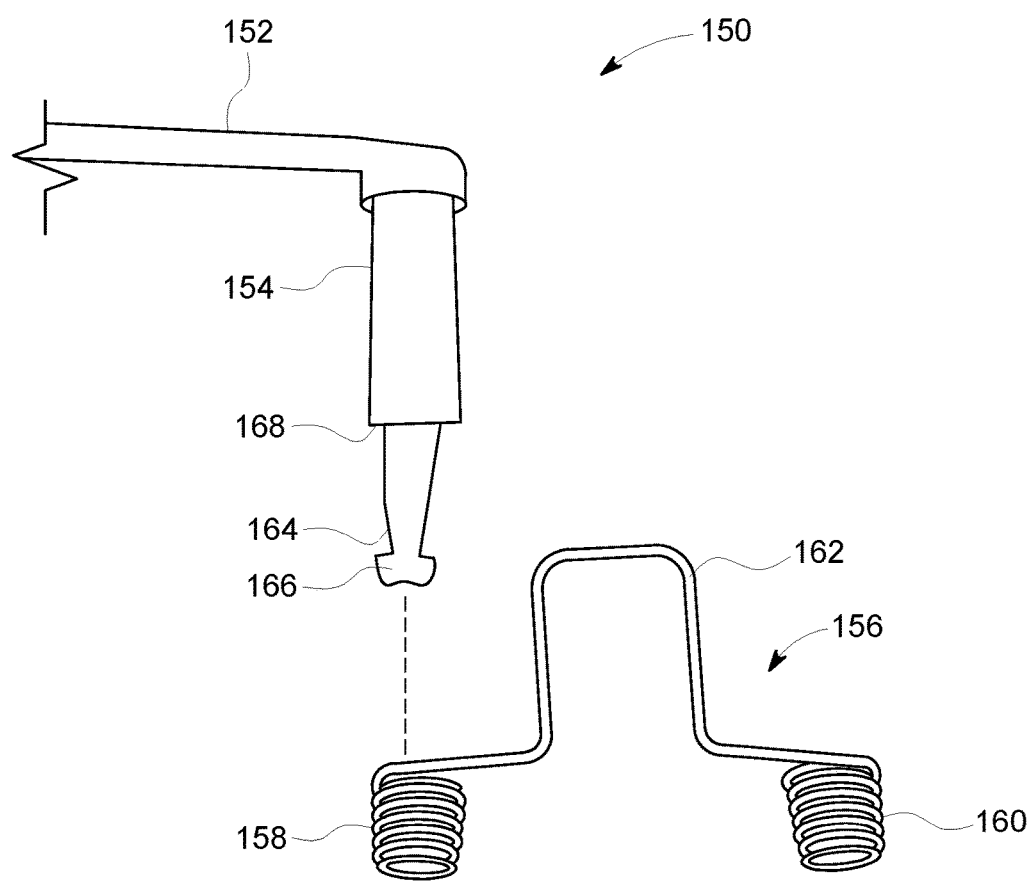
FIG. 11 is a frontal view of another embodiment for engaging the inner end of a wing with a torsion spring.

FIG. 11 is an enlarged view of another embodiment 150 of the pivot post 154 of a wing 152. Also illustrated is a spring member 156 having a first torsion spring 158 and a second torsion spring 160, each connected by an arch-shaped bridge 162. It can be seen that each torsion spring 158 and 160 is conical shaped, with the smaller diameter end located at the bottom of the respective spring. The pivot post 154 of the wing 152 is constructed with a tapered end 164 that terminates in an enlarged knob-like structure 166. Once the spring 158 is pressed onto the bottom end of the pivot post 154, it is forced to increase in diameter as it passes over the knob 166, and then when the entire spring 158 is pressed beyond the knob 166, the tapered end of the spring 158 relaxes and forms a tight grip on the post of the pivot post 154. The pivot post 154 is fabricated with a shoulder 168 that is larger than the spring 158, thus constraining the spring 158 to the bottom of the post. The other wing is fastened to the other torsion spring 160 in the same manner.

The width of a door structure which the hanger 10 can accommodate is related to the distance between outer downward depending arm and the inner pivotal post of each wing. In the preferred embodiment, each wing can swing about ninety degrees, i.e., from opposed open positions shown in FIGS. 1 and 8, to respective closed positions where each wing is rotated about ninety degrees where the inner elongate edges of each wing abut each other. It can be appreciated that thicker doors can be accommodated by making the wings longer. In the preferred embodiment, the wings are each about three inches long and can accommodate doors as thick as about two and three quarters inch.

Figure 12:
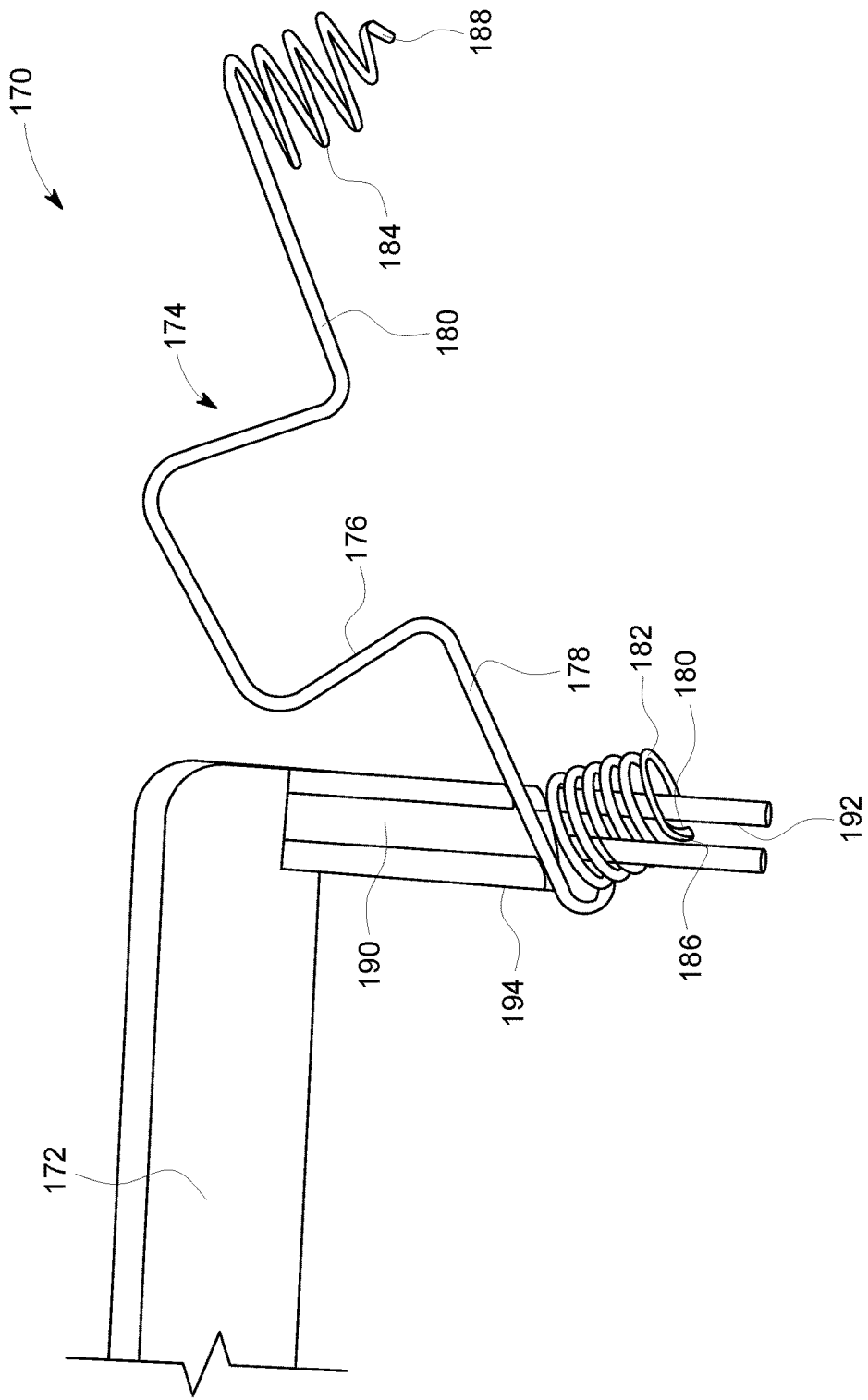
FIG. 12 is a frontal view of yet another embodiment for engaging the inner end of a wing with a torsion spring.

FIG. 12 illustrates yet another embodiment 170 of the spring-loaded door hanger in which a wing 172 engages the end of a spring member 174 having a U-shaped center section 176. The lateral arms 178 and 180 extend in opposite directions outwardly and each terminates in a respective coil spring 182 and 184. The end of each coil spring 182 and 184 terminates at its lower end in an inwardly turned end 186 and 188. The inwardly turned end 186 and 188 extend generally toward or through the center of the respective circular-shaped coil spring 182 and 184.

The wing 172 of the spring-loaded door hanger is generally planar and includes a downwardly oriented axle 190 fixed thereto. The axle 190 is split vertically at its lower end so as to have a slot 192. A split sleeve 194 slides over the axle 190 and is rotatable thereon so as to function as a bearing. The split sleeve 194 is insertable into a tubular member 66 (FIG. 9) and is rotatable therein. The other wing (not shown) is similarly constructed.

The wing 172 is spring tensioned with respect to the upright leg 12 to which the tubular member 66 is fastened. The inwardly turned end 186 of the coil spring 182 is captured within the vertical slot 192 of the wing axle 190. After the inwardly turned spring end 186 is captured within the vertical slot 192 of the axle 190, the two split ends are pressed or pinched together to narrow the bottom end of the slot 192 so that the inwardly turned spring end 186 cannot become disengaged from the slot 192. Thus, when the wing 172 is rotated from its rest position, the inwardly turned end 186 of the spring 182 also rotates, thus placing a tension or torsional force on the spring 182. It is realized that the U-shaped section 176 of the spring member 174 remains stationary during the rotation of the wing 172. The torsional force to which the spring 182 is subjected causes it to force the wing 172 back to its rest position. In practice, when applying the spring-loaded door hanger to the top edge of a door 30, the wing 172 (as well as the other wing) is forced or rotated away from its rest position so that the hanger can be lowered over the top edge of the door 30. The rotation of the wings 172 cause the springs 182 and 184 to "wind" up somewhat, whereupon when the wings 172 are released by the installer, they rotate in the reverse direction by the torsional force of the springs 182 and 184, thereby clamping the wings 172 on the outer side of the door 30, with the upright leg 12 on the inside surface of the door 30. The spring-loaded door hanger is thus clamped to the top edge of the door 30.

While the preferred and other embodiments of the door hanger are illustrated as having a pair of wings, those skilled in the art may prefer to construct the hanger with a single wing. In this instance, the inner pivotal post would be inserted into a receptacle fastened in the middle of the base plate, and spring loaded with a torsion spring. The outer end of the wing would have a downwardly depending arm that engages the inside surface of the door. A strap of metal would be attached at the top thereof to the base plate, with a hook at the bottom of the metal strap.

Those skilled in the art may also prefer to employ a mechanism for spring biasing the wings other than torsion springs. For example, the wings themselves can be constructed with a material that itself has a spring behavior so that the inner end thereof can be fastened directly to the base plate without pivoting in a tubular receptacle. Rather, the wing itself exhibits a spring behavior so that it can be manually spring biased so as to slip over the top edge of the door and then be released so that the hanger becomes clamped to the top of the door structure. As a further example, the wings can be constructed with a spring wire so that the inner end thereof is fastened to the base plate, and the length of the spring wire can be manually forced or tensioned sideways so as to slip over the top edge of the door. The outer end of the spring wire wing can be formed with a downturned arm for engaging with an inner surface of the door. Many other means of spring biasing the base plate to the door structure are possible with the teachings hereof.

While the preferred and other embodiments of the invention have been disclosed with reference to specific door apparatus, and associated methods of fabrication thereof, it is to be understood that many changes in detail may be made as a matter of engineering choices without departing from the spirit and scope of the invention, as defined by the appended claims.

What is claimed is:

1. An over-the-door apparatus attachable to a door structure, comprising:
   a base plate having a first receptacle and a second receptacle spaced from each other, said base plate engageable with an outside surface of the door structure;
   a first elongate wing having a pivot post attached to an inner end of said wing, the pivot post of said wing insertable into said first receptacle, said first wing having a downturned end located at an outer end of said first wing, the downturned end engaging an inside surface of the door structure;
   a second elongate wing having a pivot post attached to an inner end of said second wing, the pivot post of said second wing insertable into said second receptacle, said second wing having a downturned end located at an outer end of said second wing, the downturned end of said second wing also engaging the inside surface of the door structure; and
   a single spring member having spaced apart torsion springs connected with a connecting wire, said spring member for biasing said first and second elongate wings with respect to said base plate, and wherein the downturned ends of said first and second elongate wings are biased against the inside surface of the door structure.

2. The over-the-door apparatus of claim 1, further including an upright leg depending downwardly from said base plate, said upright leg including at a bottom thereof a hook for suspending therefrom an ornament.

3. The over-the-door apparatus of claim 2, wherein said upright leg is channel shaped, and further including a blade slideable within said channel-shaped upright leg, said hook is formed at a bottom of said blade.

4. The over-the-door apparatus of claim 3, wherein said blade includes at least one shoulder, and said channel-shaped upright leg includes plural barbs each adapted for being engageable with said shoulder, a portion of said blade is spring biased and when said portion is depressed said shoulder is disengaged from a barb to allow said blade to move within said channel, and when said spring biased portion of said blade is released the shoulder is allowed to engage a different said barb.

5. The over-the-door apparatus of claim 1, wherein said first and second torsion springs are arranged so that said first elongate wing is pivotally rotated in a direction opposite that of said second elongate wing.

6. An over-the-door apparatus, comprising:
a base plate engageable with an outer surface of a door structure;
an upright leg member depending from said base plate, a bottom end of said upright leg member having a hook for hanging an item therefrom;
a first wing having a first end and a second end, the first end of said first wing being pivotal about a vertical axis to said base plate, and a first downturned arm attached to the second end of said first wing;
a second wing having a first end and a second end, the first end of said second wing being pivotal about a vertical axis to said base plate, and a second downturned arm attached to the second end of said second wing; and
a single spring member operatively connected to said first and second wings for pivoting said first wing and said second wing in opposite directions.

7. The over-the-door apparatus of claim 6, wherein said base plate is constructed with a first receptacle and a second receptacle, said first receptacle for receiving therein the first end of said first wing, and said second receptacle for receiving therein the first end of said second wing.

8. The over-the-door apparatus of claim 6, wherein said single spring member includes a pair of spaced-apart torsion springs, said pair of torsion springs connected by a length of wire so that the torsion springs are each located at an opposite lateral side of said base plate.

9. The over-the-door apparatus of claim 8, wherein an end of each said torsion springs engages a respective bottom of the first ends of said first and second wings.

10. The over-the-door apparatus of claim 6, wherein said upright leg is constructed so as to be adjustable in length, whereby said hook can be adjusted to different vertical positions.

11. The over-the-door apparatus of claim 6, wherein said first and second wings are constructed with planar members that fit between a top edge of the door structure and a top frame of the door structure.

12. A method of constructing an over-the-door apparatus for a door that closes within a door frame in which a top edge of the door is spaced from an upper part of the door frame, said method comprising:

fabricating a base plate for placement adjacent an outside surface of the door;
fabricating a first wing and a second wing with respective outer ends that are downturned, said downturned ends each for engaging an inside surface of the door;
said first wing and said second wing each having a respective planar member for fitting in the space between the top edge of the door and the upper door frame part so that said door can swing in and out of the door frame without interference with said first and second wing;
mounting an inner end of said first wing to said base plate so that the outer downturned end of said first wing is spring biased to said base plate;
mounting an inner end of said second wing to said base plate so that the outer downturned end of said second wing is spring biased to said base plate; and
fastening a hook depending downwardly from said base plate.

13. The method of claim 12, further including spring biasing each said first and second wings to said base plate with respective torsion springs.

14. The method of claim 12, further including spring biasing each said first and second wings in opposite directions.

15. Apparatus for spring biasing panels of a bifold door structure, comprising:
a hinge having a first leaf and a second leaf, each said first and second leaf fastened to a respective panel of said bifold door structure, a first receptacle fastened to said first leaf;
at least one elongate wing having a pivot post attached to an inner end of said wing, the pivot post of said wing insertable into said first receptacle, said wing having a downturned end located at an outer end of said wing, the downturned end engaging a surface of one panel of the bifold door structure; and
a spring member for biasing said elongate wing so that the pivot post of said elongate wing pivots in said receptacle of said first leaf, and wherein the downturned end of said elongate wing is biased against a panel surface of the bifold door structure to hinge one panel with respect to another panel of said bifold door structure.

16. The bifold door apparatus of claim 15, wherein said at least one elongate wing defines a first wing, and further including a second receptacle fastened to said second leaf, and including a second elongate wing having a pivot post attached to an inner end of said second wing, and said second elongate wing is spring biased.

17. The bifold door apparatus of claim 15, wherein said bifold door structure comprises a first panel and a second panel, said first leaf of said hinge attachable to said first panel and said second leaf of said hinge attachable to said second panel;
the pivot post of said first elongate wing is spring biased in said first receptacle and the downturned end of said first elongate wing is biased against the second panel; and
the pivot post of said second elongate wing is spring biased in a second receptacle of said second hinge leaf, and the downturned end of said second elongate wing is biased against said first panel.

18. The over-the-door apparatus of claim 1, wherein the connecting wire of said spring member includes an arch member for connecting said first and second torsion springs, said first torsion spring engageable with the pivot post of said first elongate wing, and said second torsion spring engageable with the pivot post of said second elongate wing.

\* \* \* \* \*